United States Patent
Dofher

(10) Patent No.: US 8,417,083 B2
(45) Date of Patent: Apr. 9, 2013

(54) FIBRE OPTIC NETWORK INSTALLATION

(75) Inventor: Darren Dofher, British Columbia (CA)

(73) Assignee: Teraspan Networks Inc., Burnaby, British Columbia (CA)

( * ) Notice: Subject to any disclaimer, the term of this patent is extended or adjusted under 35 U.S.C. 154(b) by 0 days.

(21) Appl. No.: 12/598,846

(22) PCT Filed: Jan. 11, 2008

(86) PCT No.: PCT/CA2008/000051
§ 371 (c)(1),
(2), (4) Date: Nov. 4, 2009

(87) PCT Pub. No.: WO2008/134848
PCT Pub. Date: Nov. 13, 2008

(65) Prior Publication Data
US 2010/0086254 A1    Apr. 8, 2010

Related U.S. Application Data

(60) Provisional application No. 60/916,078, filed on May 4, 2007.

(51) Int. Cl.
*G02B 6/00* (2006.01)
*G02B 6/26* (2006.01)
*G02B 6/28* (2006.01)
*G02B 6/42* (2006.01)

(52) U.S. Cl. .............................. 385/136; 385/15; 385/24

(58) Field of Classification Search .................... 385/15, 385/24, 136
See application file for complete search history.

(56) References Cited

U.S. PATENT DOCUMENTS

| 5,336,849 | A  |   | 8/1994  | Whitney |         |
|-----------|----|---|---------|---------|---------|
| 5,898,811 | A  | * | 4/1999  | DiGiovanni et al. | 385/126 |
| 6,251,201 | B1 |   | 6/2001  | Allen   |         |
| 6,807,355 | B2 |   | 10/2004 | Dofher  |         |

(Continued)

FOREIGN PATENT DOCUMENTS

| CN | 2423586   | Y | 3/2001 |
|----|-----------|---|--------|
| CN | 101688961 | A | 3/2010 |

OTHER PUBLICATIONS

English translation of Chinese Search Report issued in Patent Application No. GCC/P/2008/10717 dated Mar. 3, 2011.
New Zealand Examination Report dated Jul. 18, 2012.

*Primary Examiner* — Ryan Lepisto
*Assistant Examiner* — Jerry Blevins
(74) *Attorney, Agent, or Firm* — McDermott Will & Emery LLP

(57) ABSTRACT

A fiber optic network system for a multi-staged installation to a plurality of present and future user locations includes an aggregation point, a trunk line with a plurality of optic fiber cables leading from the aggregation point and at least one branch junction location to serve a future cable user. The trunk line includes at least one dark cable having a free end for removal from the branch junction location. The trunk line includes a trunk conduit having opposing side walls defining an interior space between the side walls for housing the cables. The conduit is configured to permit withdrawal of the length of dark cable from the conduit at a stage subsequent to installation of the trunk line to form a branch leading to the future user location. The dark cable stored within the interior of the conduit has sufficient length to reach the location of the future user.

3 Claims, 7 Drawing Sheets

U.S. PATENT DOCUMENTS

| | | |
|---|---|---|
| 6,965,302 B2 | 11/2005 | Mollenkopf et al. |
| 7,050,683 B2 | 5/2006 | Dofher |
| 7,574,092 B2 | 8/2009 | Dofher |
| 7,609,933 B2 | 10/2009 | Dofher |
| 2003/0123824 A1 | 7/2003 | Tatarka et al. |
| 2003/0123935 A1 | 7/2003 | Dofher |
| 2004/0080806 A1 | 4/2004 | Blakley |

* cited by examiner

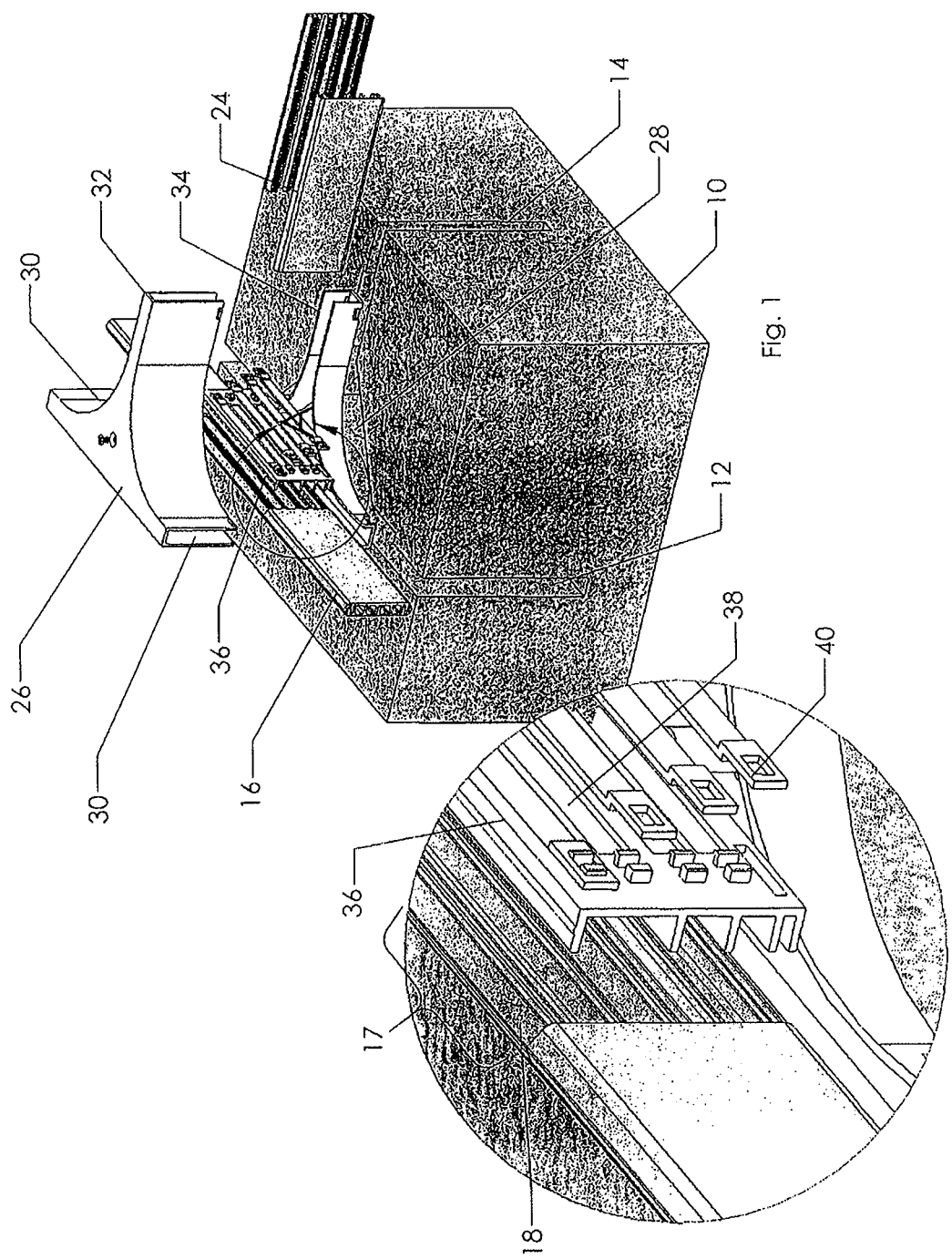

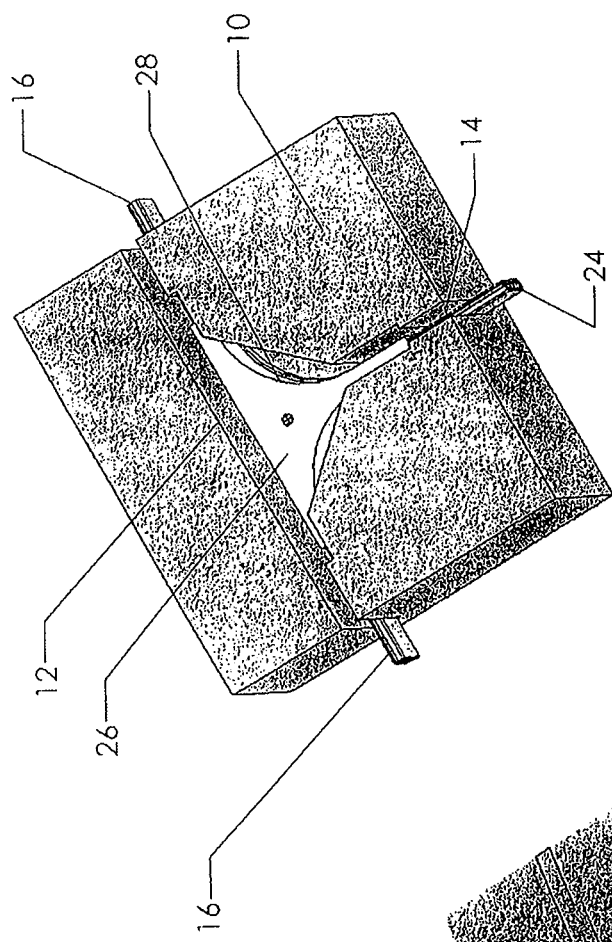
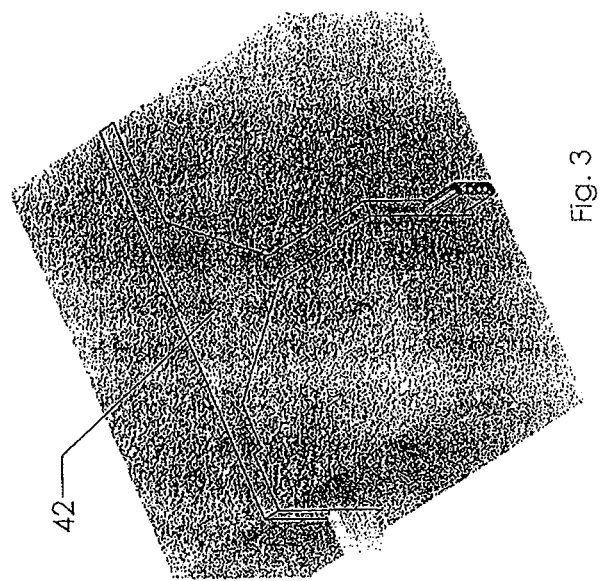
Fig. 4
Fig. 3

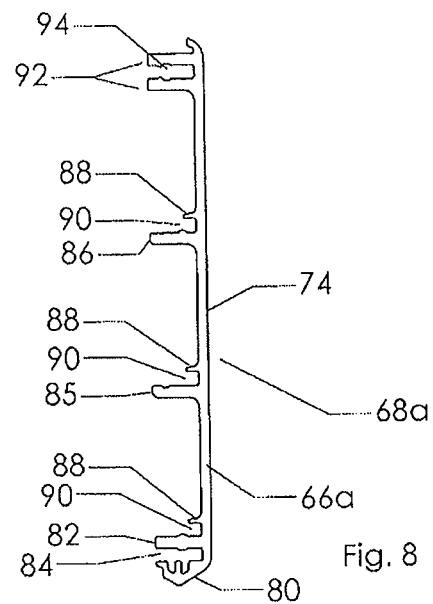
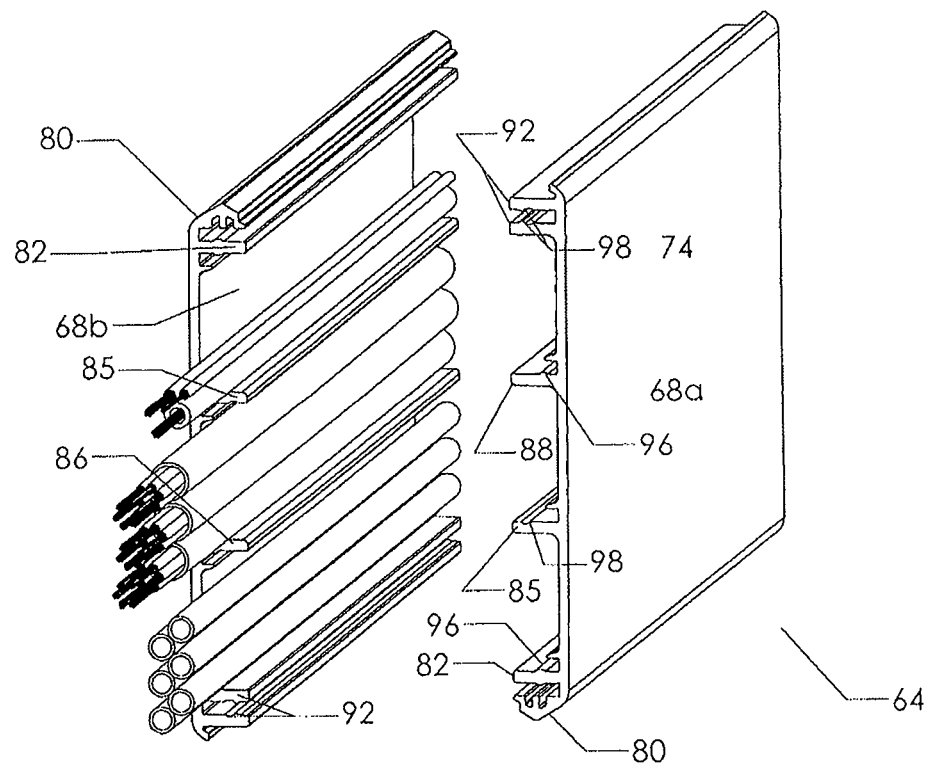

FIBRE OPTIC NETWORK INSTALLATION

PRIORITY STATEMENT

This application is the U.S. National Phase under 35 U.S.C. §371 of International Application No. PCT/CA2008/000051, filed on Jan. 11, 2008, which in turn claims the benefit of priority to U.S. Provisional Application Ser. No. 60/916,078 filed May 4, 2007, the disclosures of which applications are incorporated herein by reference.

FIELD OF THE INVENTION

The present invention relates to fibre optic networks, in particular fibre optic networks buried below a surface, wherein the fibre optic cables and fibres are protected from the elements by an external duct or conduit. The invention relates to systems, apparatus and methods for providing a fibre optic network.

BACKGROUND OF THE INVENTION

A challenge faced by the telecommunications industry is the high cost of installing optical fibre between the provider and the end customer. Some of the highest costs are incurred in the so-called "last mile" of installation, namely the installation of lines to individual customers and limited groups of customers, often within urban areas. In particular, as customers are added to a network, the generation of a new branch line can be difficult and costly, often requiring the installer to make a splice or junction with the trunk line and to provide loops of surplus cable at predetermined locations in advance when installing the initial trunk lines. With the rapidly growing need for high-speed data connections to businesses and residences (driven mainly by the need to access the Internet) a faster and more economical method is needed for installation of cable networks, especially within new and growing residential and commercial areas.

Optical cables are typically buried, which can present difficulties when it is desired to expand a network. Typically, when a cable network is installed within a new housing or business/industrial development, many of the occupants will not initially require a cable connection and indeed, a house or building may not yet exist at many addresses when the network is initially installed. Typically, when a customer subsequently orders a cable-delivered service (such as internet or video services) it becomes necessary to install a cable to the residence. Desirably, this is accomplished with a minimum of difficulty.

The need to service future customers may be met by pre-installing "dark line" at suitable locations within the cable network, which may be extracted and converted into "lit line" when a new customer is added to the network. However, it can be difficult to conveniently store suitable lengths of dark line within the network at suitable locations. There is thus a need for systems to store such lengths of dark line within an installed network, which may then be conveniently extracted when needed.

One approach for an inexpensive and simple means to install fibre optic cable is within a shallow slot-like trench cut into an upper layer of pavement or the like, for the laying of a cable within or immediately under a street or other surface. The trench may be cut with a single pass of a slab saw. Such a system is best employed when combined with a convenient means to form junctions or branches within the cable system leading to individual users. In conventional cable-laying systems or methods, the forming of a branching network requires considerable additional excavation and other labour in order to install conventional junction boxes or the like and to form a splice at the junction.

The need for a convenient way to expand a network by adding branches requires an easy means to provide a branch line of cable without requiring the labour-intensive job of splicing in new cables to meet growing system needs. The present inventor has previously developed systems for storing of surplus cable for such future use at intersection points or other nodes, for example as loops of cable which is stored within a buried housing, in combination with a convenient junction box. However, in some situations it is more convenient to supply lengths of dark cable in uncoiled form, within the trunk conduit alongside the lit cables such that a suitable length dark cable may be withdrawn from the conduit when required. It has hitherto been difficult to provide a system that conveniently permits this.

It is desirable to provide a system and method for storing and routing fibre optic cables that meet the following needs:
a) the ability for the cables and system components to fit within a narrow slot-like trench or cut;
b) reduced requirement for cable loops that must be stored within additional buried containers for future system expansion; and
c) reduced requirement to form cable splices at the branch junction locations.

Buried fibre optic cable networks generally comprise trunk and branch lines, which intersect at a plurality of nodes. The branch lines may lead to collection points, or to individual houses or buildings. Within certain segments, trunk and branch lines may coincide, for example where it is necessary for branch lines to backtrack over the route of a trunk line, i.e., "back-haul" segments.

A drawback of current network systems for storing and routing cables within substrates is that the complexity of the network can require the installer to provide either a relatively wide cut for installation of multiple lines, or a series of parallel cuts. This need can arise to accommodate back-haul lines. In the past, back-haul lines have been installed within parallel cable ducts alongside the trunk line. However, parallel ducts of this type require additional space within the surface cut or additional cuts, making installation more difficult and costly.

Trunk lines conventionally include a cable that includes a large number of optic fibres bound by an external sheath, which is relatively rigid so as to protect the fibres from breaking or crushing. Cables of this type typically range in size from approximately 6 mm in width, comprising 72 fibres, to about 25 mm in width, bundling 800 fibres.

It is also known to install optical fibres via blowing of fibres through hollow tubes. For this purpose, a hollow tube having a relatively narrow diameter is provided, with individual optical fibre (cables) being blown through the tube. This installation method has the advantage that it is relatively easy to provide optical fibres within a pre-installed network, for example, to supply an optic fibre to a new customer. Optic fibre blowing offers flexibility, although it is best suited for relatively short distances. For this reason, it is best suited for use in branch lines, or short portions of trunk lines. As well, optic fibre blowing is best suited for installing a limited number of optic fibres within a single tube. Thus, this installation method is not well suited for large trunk lines containing a large number of individual fibres. One drawback of blowing tubes is their bulk, in that the tube diameter makes it difficult to accommodate multiple tubes and cables within a single narrow cut or channel, particularly tubes and cables having different diameters. It is useful to provide a fibre optic network which permits a combination of bundled fibres, including bundled fibres of different diameters, and blowing tubes for blowing of optical fibres where appropriate.

The present inventor has previously described in WO/2002/065182 a system for a fibre optic network consisting essentially of relatively narrow channels cut within a surface, such as a road. Within this type of system, many of the network components are installed within narrow channels, including trunk lines, branch lines and optionally some or all of the nodes. It is simple to install such a system wherein the trunk and branch lines are installed within relatively narrow road cuts which can be easily restored after the cables are installed within the channels. The cut may be made by a single pass of a slab saw. For use in a system of this type, the inventor has developed a cable protector which is well suited for surface inlay installations. In the surface inlay method, all components of the network are surface installed by vertical inlay of the cable and associated components (conduits, junction housings etc.). There is no need to thread individual cables through any component of the network. All components of the network may be assembled on-site or in advance. The surface inlay method permits components to be installed around uncut lengths of cable; there is no need to cut a cable so as to generate a free end for threading through any component. The entire network may then be simply inlayed piecemeal into the cut, without any threading of cables through any component of the system.

One of the components of such a system is the narrow profile protective conduit described in the inventor's U.S. Pat. No. 6,807,355, which is incorporated herein by reference. This type of conduit is configured to retain multiple cables in a narrow stacked array within the conduit interior. This type of conduit is particularly useful for surface inlay installation of cables within a narrow channel or cut made within a surface.

Several patents have been issued for technology relating to electrical and optical fibre cable installations.

One example is U.S. Pat. No. 5,879,109 issued to Finzel, et al. which provides a complex process for installing optical or electrical cable into solid surfaces such as asphalt. The method uses a slow moving apparatus to heat the ground surface until it has softened. A channel-forming unit is subsequently used to introduce a channel into the heated ground by displacing the ground material alongside the channel border. A laying unit is then used to introduce the optical or electrical cable into the channel, followed by a filling unit which is used to reintroduce the displaced ground material back into the channel and then rolled to compact the ground material which has been reintroduced into the channel.

U.S. Pat. No. 6,065,902 issued to Mayr, et al. provides a method and apparatus for on-site production and installation of optical fibre cable at the location for placing. This method seeks to reduce transportation costs and quantity of material required for large-scale optical fibre cable installations.

Canadian patent no. 2,237,324 to Zeidler et al. discloses a method for laying a fibre optic cable of between 2 mm and 10 mm within a narrow channel having a width slightly wider than the cable. The cable is introduced into the channel by means of a cable feed device, and the channel is then filled with infill material by a filling device which moves along in a coordinated fashion with the laying device. The laying channel extends into the top several layers of a paved surface and is between 4 cm and 15 cm in depth, with 7 cm being identified as ideal.

There is a need for a convenient arrangement for forming cable junctions. There is a need to easily provide slack in the installed cable to accommodate junctions, system expansions and repairs. There is a further need to easily accommodate a variety of surfaces including pavement, sidewalks, vertical walls, unpaved surfaces such as sod, etc.

SUMMARY OF THE INVENTION

Objects of this invention include providing improved systems and methods for storing and routing fibre optic cables through branched substrate channels, to provide a convenient cable network branching system and to accommodate future expansion of the network. The present invention takes advantage of the fact that, in many cases, one may predict at the time of initially installing cable trunk lines the general location of at least some future branches. For example, when installing trunk lines in a new housing or commercial development, the location of the building lots are generally all known as are the locations or approximate locations of the eventual structures. An inexpensive means to pre-install a branch at this location will save much of the labour required at a later date. Since it is not known whether a branch will in fact be required at any given location, there is a need for a simple and inexpensive way to pre-install a dark line for possible use in a branch line.

In one aspect, the invention relates to a system for storing and routing fibre optic cables in a sub-surface network installation buried within an array of narrow channels, trenches or cuts. The system comprises a plurality of conduits for protecting and storing a plurality of fibre optic cables, consisting of trunk and branch conduits. Each conduit comprises an elongate cable protector having opposing side walls which separate to receive an optic fibre within the interior of the housing, without requiring any cutting or threading of the fibre into the conduit. Preferably, the trunk fibre optic cable conduit comprises a plurality of internal sub-compartments defined by one or more internal dividers that extend along the length of the conduit. The sub-compartments are arranged in a vertical stacked array and each hold a plurality of fibre optic cables which may be of different diameters. These sub-compartments serve to separate the optic cables for ease of handling and to reduce the friction when fishing a dark cable out from the conduit.

The optic cables within the trunk conduits include both lit cables that are connected to active users via branch lines, and dark cables that are unconnected to active users and which are available for future use. The dark cables are supplied in lengths which permit the cables to reach expected future user locations. The dark cables remain within the trunk conduits until such time as they are required to form a new branch, at which time they are withdrawn from the conduit at the new branch location as described herein.

Because it is desirable to provide multiple branch lines as part of a fibre optic cable network, one or both of the sidewalls of the conduits include openings or gaps at specific points to expose the optic fibres at locations where a junction with a branch line may be desired in the future. These openings expose the housed and stored fibre optic cables so that one or more of these branch cables can be withdrawn from the trunk conduit for installation at a given user location. The branch line, when installed, may be protected within a branch line conduit, which is within a newly prepared channel that leads to the new user location.

The present invention relates, in one broad aspect, to a fibre optic network system for a multi-staged installation to a plurality of present and future user locations. The term "multi-staged" refers to the process of an initial installation to one or more initial users, followed by a subsequent installation of cables to additional future users at different locations. Although the present invention is intended for a staged installation (for example, first and second stages) separated by time, it will be seen that the invention may readily be used in connection with a single installation process, wherein the first and second stages are not effectively separated in time. The system comprises in general terms a cable aggregation point with a trunk line comprising a plurality of optic fibre cables leading from said aggregation point. The conduit for the trunk line may initially retain within its interior at least one "dark" (i.e. not in active use, as distinct from an active "lit" cable) cable having a free end for connection to a future user location. The system includes a protective conduit to house the trunk line composed of opposing side walls defining an interior space between said side walls. A length of the dark cable is also retained within the interior space alongside the trunk line(s). The system further includes at least one branch junction location or "node" to serve a future user location. The location may be virtual, in that it is not necessarily initially defined by any physical structure, but simply an arbitrary location assigned as the location of an expected future customer. Alternatively, the location may be determined by a removable segment from the conduit, as described below.

The dark cable within the conduit has a length sufficient to reach the future user location, to the extent this can be predicted. The trunk line conduit is configured to permit withdrawal of said length of said dark cable from said conduit at the stage subsequent to installation of said trunk line to form a branch leading to the future user location.

According to another aspect, the trunk conduit comprises at least one internal divider defining a plurality of internal sub-compartments extending lengthwise along the conduit. The sub-compartments are configured to retain the cables within their interiors, and arranged such that separation of at least a portion of said side walls exposes at least one of said sub-compartments. Preferably, the sub-compartments are configured in a stacked vertical array. For example, one of the compartments may be dedicated to "back-haul" branch cables.

According to another aspect, one of said side walls of said trunk conduit at the location of the branch junction comprises a removable segment. Removal of said segment exposes the interior of said trunk conduit to permit removal of said length of dark cable therefrom. In another aspect, the segment further includes removable plugs for selectively covering the openings to prevent contamination of the conduit prior to installation of a branch line at this location. In another aspect the system further includes a protective housing for covering the trunk and branch conduits at the branch junction location, once the junction is formed. According to this aspect, the housing comprises intersecting slots configured to receive the trunk and branch conduits such that the interior spaces thereof are aligned and in communication with each other. In some embodiments, the housing is generally T-shaped and comprises a first slot for receiving the trunk line intersecting with a second slot for receiving the branch line. The housing has a top cover portion and side walls that are spaced apart to define the slots therebetween. The side walls may be provided with stops which permit the trunk and branch conduits to enter only the initial portion of the slots, while leaving the cables exposed where they intersect. The housing may also include a base configured to connect with the side walls of the housing, such that the housing forms a generally sealed unit when installed with the conduits partially entering the slots, wherein the conduits are configured to fit snugly within the slots.

According to another aspect, the invention relates to a method of installing a fibre optic cable network within a substrate by providing a system as defined above, forming at least one channel within the substrate, installing a trunk line within the channel, opening a portion of one of the side walls of the conduit to expose the fibre optic cables at a branch junction location, and withdrawing at least one of the free ends of the fibre optic cables through the opening for installation of the fibre optic cable at a user location. The cables may be withdrawn from the conduit in multiple stages, wherein at least one of the cables is a dark cable which is withdrawn subsequent to the installation of the original network.

According to another aspect, the invention relates to a kit of parts for making a branching fibre optic cable network system for installation in multiple stages to a plurality of present and future user locations. The kit includes the components of the system described above, together with written instructions to carry out the method described above.

According to another aspect, the invention relates to a system for surface inlay installation of a fibre optic network within an array of narrow trenches within a surface. The system includes a plurality of fibre optic cables including a diversity of cable types such as trunk cables and branch cables, for example. The branch cables may include backhaul segments. The system also includes at least one node defining an intersection between the trunk and branch cables and at least one elongate cable protector for installation within one of the trenches. The cable protector is configured to retain a combination of trunk cables and branch cables and is made up of a pair of spaced apart opposing walls that define an enclosed space therebetween. The cable protector has at least one horizontal internal divider to divide the space into a plurality of internal compartments extending lengthwise along the member. The compartments each are dimensioned to retain therein a plurality of cables. The opposing walls are separable to expose the compartments and permit inlay installation of the cables within the compartments. At least one of the cable protectors is configured to retain a combination of trunk and back-haul lines therewithin for burial within a common trench.

In some embodiments, the cables include at least one distribution cable and at least one additional cable selected from a simplex cable, a loose tube cable and a cable blowing duct. The plurality of distribution cables may be installed within a first of the compartments, and the plurality of additional cables may be installed within a second of the compartments.

According to a still further aspect, the invention relates to an elongate cable protector for installation within a narrow trench, the cable protector including a pair of spaced apart opposing walls that define an enclosed space therebetween, and at least one internal divider to divide the space into a plurality of vertically aligned internal compartments extending lengthwise along the length of the cable protector. The compartments are each dimensioned to permit installation therein of a plurality of said cables of each cable type by separation of the walls to expose the compartments and permit inlay installation of the cables within the compartments. At least one of the internal compartments is dimensioned to retain therein, for example, a stacked array of three cables each having a diameter of 6 mm. If the diameters of the cables are sufficiently smaller, additional cables may be added to the internal compartment.

According to a still further aspect, the invention relates to a method for installing a fibre optic network. The method includes the steps of: forming an array of narrow trenches within a surface comprising at least one trunk and branch line meeting at one or more nodes, providing a plurality of fibre optic cables of different cable types including at least one trunk cable and at least one branch cable, providing at least one cable protector as defined above, separating the walls of the cable protector to expose the internal compartments, inlaying the cables into the compartments, installing the cable protector with the cables within the trunk line, and optionally, installing a second cable protector with a branch cable installed therein, within the branch line. At least one of the installed cables represents a back-haul segment of a branch cable.

In some embodiments, the plurality of cables includes a plurality of distribution cables installed within a first of the compartments within the protector, and a plurality of the back-haul branch cables installed within a second of the compartments.

The system also includes a junction housing configured for installation at a junction to protect the exposed cables at this location, as described above.

Another aspect of the invention is a method for creating a branch point within a trunk line. In this method, fibre optic cables stored within a trunk line conduit in a substrate channel have free ends dedicated for installation at specific buildings at branch points along the trunk line. An opening is prepared in a side wall of the main fibre optic cable conduit to expose the fibre optic cables, at a location which is at a distance from the free end of a selected cable. Preferably, the opening consists of a pre-formed covered opening as described above. The selected cable is then withdrawn from the conduit until the free end is reached. The removed cable may then be used to form a branch line, and is then enclosed within another conduit herein designated a "branch conduit." Optionally the junction is protected by the junction housing described above. A branch channel is prepared for insertion of the branch line to the user.

The present invention will now be further described by way of detailed descriptions of particular embodiments thereof. It will be understood that such description is not intended to limit the scope of the present invention, and that persons skilled in the art may readily make modifications to the described embodiments. It will be further understood that any dimensions are presented merely by way of example. As well, any directional references described herein, whether in the patent specification or claims, are merely for convenience of description and are not intended to limit the scope of the invention. This includes such direct or indirect references as "side wall", horizontal, and the like. It will be further understood that the terms "fibre optic cable," "cable" and "optic fibre" and the like refer to any known or future line, cable, fibre or the like for transmitting information, and includes sheathed or unsheathed optic fibres or bundles or optic fibres. These terms also include open tubes for retaining optic fibres, such as blowing tubes which are intended to receive an optic fibre, whether or not such tubes include an optic fibre therein.

BRIEF DESCRIPTION OF THE DRAWINGS

FIG. 1 is a perspective view of an embodiment of the present invention, shown in an exploded view partially in cross section;

FIG. 2 is a perspective view of the portion of FIG. 1 encircled by circle "A."

FIG. 3 is a perspective view of a trunk/branch junction of the first embodiment, with the surface restored.

FIG. 4 is a perspective view of the junction of FIG. 3, with the surface excavated to show subsurface structures.

FIG. 8 is an end view of a separated half of an embodiment of the conduit according to the present invention.

FIG. 9 is a perspective view of a conduit according to FIG. 8, in the open position with the halves separated, showing an array of cables and tubes installed therein.

DETAILED DESCRIPTION

Figure 5:
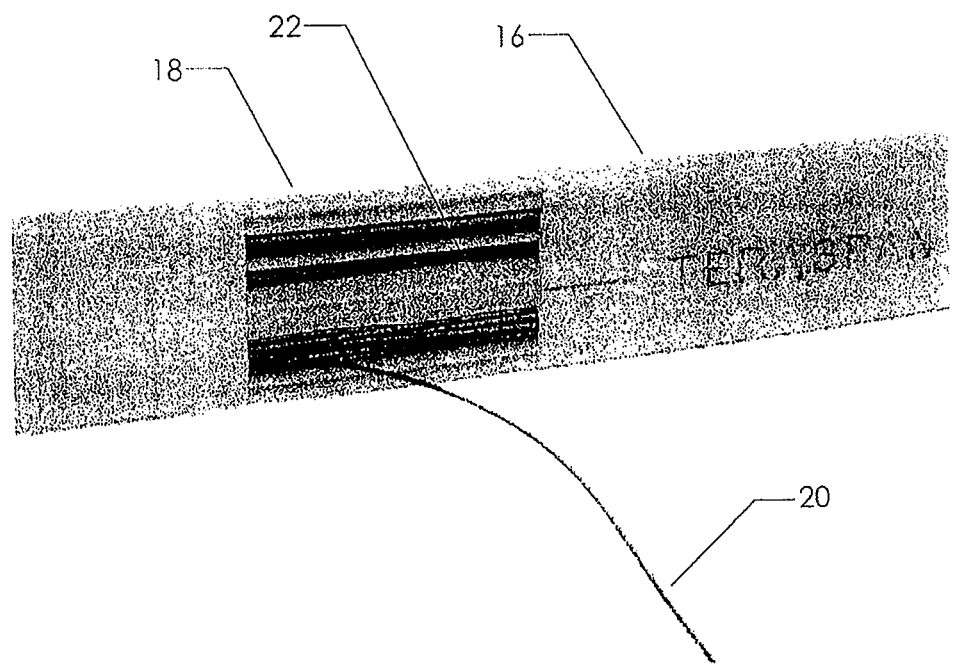
FIG. 5 is a perspective view of a portion of a conduit according to the first embodiment, with a portion of one side wall removed for access into the interior.

According to one embodiment shown in FIGS. 1-5, the initial stage of installing the system according to one aspect of the invention involves cutting a primary or trunk channel 12 within a substrate 10. The substrate 10 may consist of essentially any surface including a road surface, a walkway, sidewalk, masonry wall or the like. The surface may be a hard surface or a soft surface such as turf. The channel 12 is narrow and may be conveniently formed by making a single pass of a slab saw. A primary fibre optic cable conduit 16 is inserted into the channel 12. The installer must determine the location or locations of expected branch points in the network where future (or present) expansion may be forthcoming, for example where a new house or building is planned and it is possible that a cable branch will be required. At this junction location, a segment of one wall of the primary fibre optic cable conduit is removed to form a gap 17 in the conduit wall so as to expose the interior of the conduit at this location. The gap 17 may be formed at the time the trunk line is installed or subsequently at the time the branch line is added. In the first case, a trunk conduit may be provided which includes pre-existing gaps so as to remove the requirement for cutting away the conduit wall at this point. The gap exposes the fibre optic cables 20 contained within the interior of the conduit.

As shown in FIG. 2, a cover plate 36 is provided for covering the gap 17 in the primary fibre optic cable conduit 16. The plate may fit onto the conduit with a friction or snap-lock fitting that firmly retains the plate to the conduit. The cover plate 36 includes one or more slot-like openings 38 which permit withdrawing a length of a fibre optic cable 20 from the conduit in a manner to be described in detail herein. The openings are sealed by removable plugs 40 when they are not in use in a junction location. The cover plate and the openings therein are sufficiently long to permit a worker to withdraw the dark cable out from the trunk conduit with reasonable ease. The exact length is matter of design choice and depends in part on the type of optic cable being housed and its rigidity.

A plurality of fibre optic cables is contained within one or more compartments 22 within the interior of the main fibre optic cable conduit. These fibre optic cables 20 installed at the initial stage within the conduit are of two types. The cables of the first type are the active or "lit" fibres that are connected to a user location such as a residence or the like. The second type comprise unconnected or "dark" fibres that are not yet connected at their distal end to a user, although at their proximal end they remain connected to the central collection point. These dark fibres are stored in an elongated fashion within the primary fibre optic cable conduit 16 for future use. They consist of a length of cable which is sufficiently long to reach the expected user location, such as a residence, from a predetermined junction location along the channel. Usually, the exact such length will not be known in advance and one should provide a longer length than is expected to be used. The dark fibres are contained within the conduits alongside and in the same manner as the lit fibres. Conveniently, the dark fibres may be marked in a convenient fashion, for example they may always be placed within the same one of the internal compartments, such as the uppermost and/or lowermost compartment, for convenience. The dark cables extend lengthwise within the conduit past the junction point for as long as required. More than one such dark cable may be associated with the same gap, in contemplation of multiple users at the same location.

It will be seen that withdrawing a long length of dark cable from a conduit may require a fair amount for pulling force. For this reason, it is desirable to provide the optic fibres within a relatively low friction and sturdy outer casing, and as well the conduits can comprise a low friction substance to reduce the pulling forces required. It may also be desirable to equip the undeployed dark cables with a means for withdrawing them from the trunk conduit for installation of a branch line. Such means may include pull ropes or jet lines which may optionally be color coded or otherwise labeled for ease in identification and assignment to specific future branch line locations.

In some embodiments, one or more of the fibre optic cables 20 are dedicated for a specific building along a path defined by the main fibre optic cable conduit 16 and these cables have free ends which can be removed from the main fibre optic cable conduit 16 for delivery to a building.

The second stage of installing the network occurs when installation of a new branch in a fibre optic cable network is desired for a specific building for example. Often, this may occur a considerable time after the initial stage. At this stage, the conduit is uncovered at the junction location. The junction location may comprise a pre-formed gap within the conduit covered by the plate and optionally also the junction housing, described below. Alternatively, the junction location may comprise an arbitrary location a long the trunk line, in which case the gap is formed within a conduit wall at the time of installing the branch, along with installation of the cover and subsequently installation of the housing. The dark fibre optic cable 20 designated for the specific building or location is removed from the conduit at this region by withdrawing a length of the dark cable through the opening 38 in the cover plate 36. At the intersection location it is necessary to remove sufficient material from the overlying pavement or other surface to install a housing, as discussed below. A secondary cut in the surface is made leading from the intersection location to the new user location. A secondary or branch optic cable conduit 24 is installed so as to house the dark fibre optic cable 20 and the conduit is laid in the cut towards the new user location. Conveniently, the branch conduit is of the same design as the trunk conduit 16, although this is not required.

Since the dark fibre optic cable at this intersection location is pre-connected to the source, there is no need to form a splice. After installation of the branch and for protection from damage or dirt entering into the conduit openings, a junction housing 26 is provided which substantially seals the intersection region. The housing 26 is installed within a cavity 28 at the junction location. The housing 26 is composed of three lobes comprising two aligned opposing lobes and a central lobe which extends outwardly at a substantially perpendicular angle from the plane of the two aligned lobes. The housing comprises in general terms opposing sidewalls that define a central slot having an open bottom and open ends to receive the conduits. The two aligned lobes of the housing define a first slot 30 which receives the trunk fibre optic cable conduit 16. The slot is a suitable width that the conduit fits snugly therein so as to generally seal the conduit within the housing or alternatively or in additional watertight seals may be provided at all openings. The middle lobe includes a second similar slot 32 which receives the branch conduit 24. The first and second slots communicate where they intersect so as to form the junction between the trunk and branch conduits. The housing 26 includes a bottom cover plate 34 for attachment to the side walls of the housing to fully enclose the housing.

It will be seen that the junction may comprise multiple secondary lines, such as a four-way branch consisting of the primary conduit and two secondary conduits leading to two dwellings or buildings. For this purpose, the housing 26 may be adapted accordingly.

Preferably the housing 26 is made of a rigid, impervious and corrosion-proof substance such as rigid molded plastic. However, it will be seen that a wide variety of material choices may be made depending on the system requirements.

When the assembly of the system is complete, the surface is restored. The substrate channels 12, 14 and the cavity 28 are filled with a substrate material or other suitable filling material 42. The location of the intersection point may be marked with a suitable small marker embedded in the restored surface such as the marker previously described in the inventor's PCT publication WO/2007/071065. Conveniently, such a marker may also be employed at the intersection point after the first stage in order to readily locate this point.

It has been found that a particularly suitable material for restoring the surface is cold patch asphalt.

The present invention also includes a method for creating a junction in a fibre optic cable network. The method consists of the steps of providing a trunk line that comprises a cable conduit as described above, housing a plurality of optic fibre cables that are all connected at a proximate end to an aggregation point. The cables consist of lit fibres that are connected to end users at their distal ends, and dark cables that are yet to be connected to user locations and thus have a free distal end. When it is desired to form a branch to a user location, the conduit is uncovered the branch location. At this location, the conduit may include a pre-formed gap in one or both of its sidewalls or alternatively a gap may be formed at the time the branch is installed. The gap is covered with a cover plate and the plug removed to permit removal of the appropriate dark cable, which is then fished from the conduit. The freed cable is covered with a branch conduit which is then buried within a branch cut leading to the new user location. The junction is protected by installation of a housing over the trunk and branch lines at this location.

Typically, the junction location will comprise a single branch. However, with modifications multiple branches may lead from a single location. The number of branches that may be formed from a single trunk is dependent largely upon the number of optic cables that are housed within the trunk conduit. In order to increase this number, it is possible to provide multiple conduits in side by side or stacked relationship (at least for the initial run of trunk line closest to the aggregation point), or alternatively a larger conduit may be provided if desired.

Figure 6:
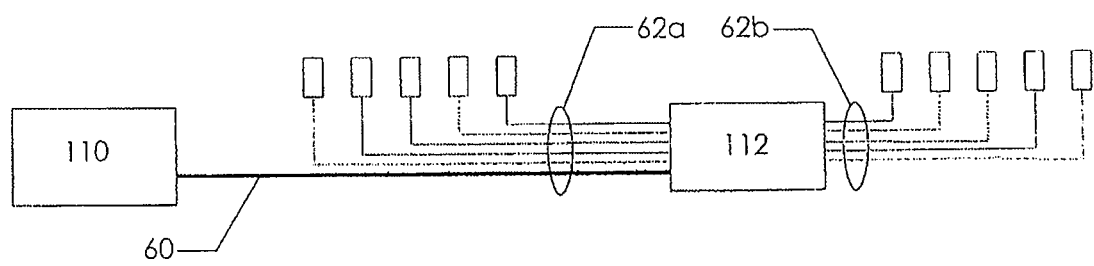
FIG. 6 is a schematic diagram of a cable network, including trunk lines, branch lines and nodes at the intersection points thereof.
Figure 7:
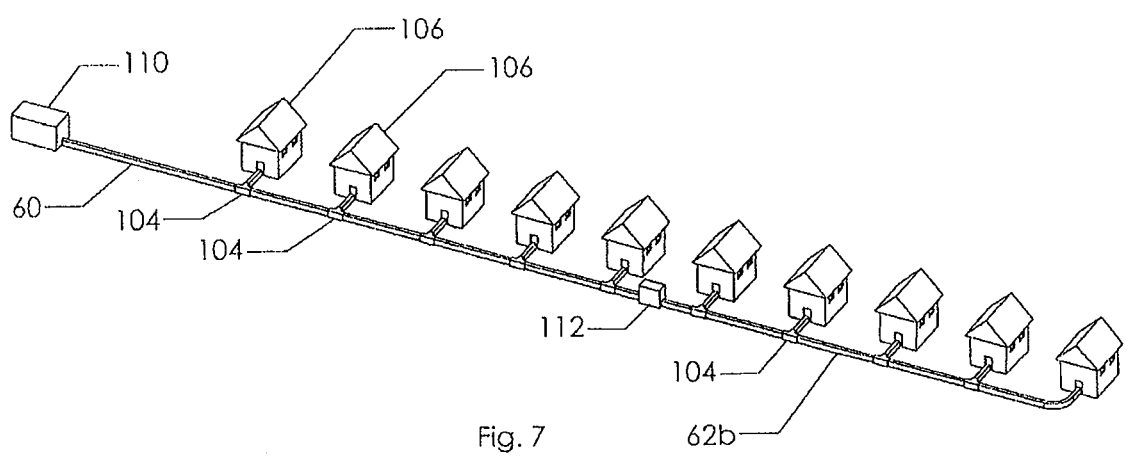
FIG. 7 is a further schematic view of the network shown in FIG. 6.

According to a further embodiment shown in FIGS. 6-12, the fibre optic cable storage and routing system of the present invention is installed in two or more stages which may be separated in time, or performed at generally the same time. Referring to FIGS. 6 and 7, the system comprises one or more trunk lines 60 to which may be added branch lines 62 leading to user locations. The trunk line emanates from a remote distribution point 110 and leads to a local distribution point 112. The branches may be added as the need arises, for example as new houses are added to a development or as customers subscribe to a cable service. The system further comprises one or more junction locations, which are the intersection points between the trunk line and present and future branches.

The fibre optic cables within the trunk line 60 are retained within conduit 64, seen in more detail in FIGS. 8-11.

FIGS. 6 and 7 schematically illustrate a fibre optic cable network, comprising one or more trunk lines 60 and branch lines 62. As described herein, a "line" consists of the optic fibre cables that define a particular function; in some cases as described herein, multiple lines may share a common conduit and substrate channel. The various lines intersect at nodes 104, which may consist of trunk/trunk, trunk/branch or branch/branch intersections. The branch lines 62 may terminate at an individual user 106, such as a residence or building. As well, nodes 104 may be provided at the locations of expected future branch lines, for example, at the locations of future residences or buildings, which may be indicated on an official plan, but which are not yet constructed.

The trunk line 60 originates from a remote distribution point 110, and terminates at local distribution point 112. A plurality of branch lines 62 radiate from the local distribution point. Some of these branch lines retrace the route of the trunk line, and constitute back-haul lines 62a. The back-haul lines terminate at user locations along the trunk line. Other branch lines, referred to herein as forward-reaching lines 62b, continue onwardly from the local distribution point 112, and terminate at user locations beyond the local distribution point. Within the network described herein, the back-haul lines 62a and the trunk lines 60 share a common channel 12 and protective conduit 64, as will be described below, for at least a portion of the length of such branch lines until they branch away towards an individual end user. The forward-reaching lines 62b share a common trench and conduit for at least a portion of their length, until they branch away towards individual end users.

Typically, the trunk lines 60 will comprise a plurality of relatively large trunk cables 120 (seen in FIGS. 11 and 12), each cable holding approximately 72 individual optic fibres. The individual blowing tubes 122 (seen in FIGS. 10-12) branch outwardly from the trunk lines, leading towards individual residences, buildings or other customer locations. The blowing tubes may be empty or may hold fibre cables that are either lit or dark.

The cable lines described herein, including the trunk lines and branch lines, are installed within narrow channel-like cuts 12 within a surface. Any given channel 12 may hold therein a trunk line 60, a branch line 62, or a shared line consisting of any combination of trunk and branch lines. In order to accommodate the cable protector conduit 64 described herein, the channels 12 are typically about 13 mm in width and 150 mm in depth, although a suitable range is approximately 11 mm to 15 mm in width, and 80 mm to 400 mm in depth. The relative narrow width of the channels permits them to be formed with a single pass of a saw, for example, of the type described in the present applicant's U.S. patent application Ser. No. 11/853,489.

The branch lines 62a and 62b may comprise a plurality of cable types, including two or more distribution cables, and a plurality of smaller cables, including simplex, duplex, etc., as well as cable blowing tubes. As described herein, the back-haul line 62a shares a conduit and channel with the trunk line 60 in order to simplify construction and assembly of the network.

Figure 10:
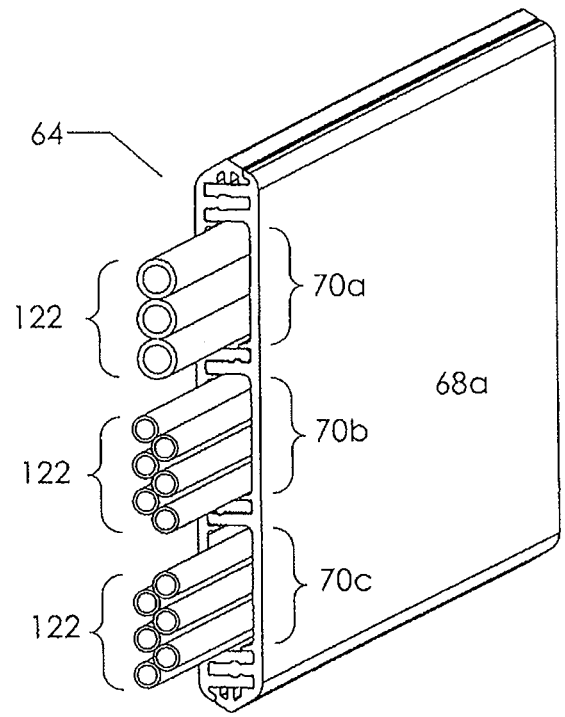
FIG. 10 is a perspective view of the conduit of FIG. 9 in the closed position, showing cable conduits and tubes installed therein.

A network installation may consist of a trunk line 60, consisting of a cable protector 64 installed within a trench 12, with a plurality of cable types being installed within the cable protector. Installation of the trunk line is performed by initially cutting a single narrow trench within a surface, for example using a slab saw. A desired cable array is then installed within a cable protector of a suitable length. Depending on the length, multiple protectors may be supplied for installation in end to end abutting relationship. At the same time, back-haul lines 62a may be installed within different compartments within the same protector 64, including both lit and dark lines. For example, the plurality of cable types described above may be installed within the cable protector. Installation of cable within the protector is performed by opening the opposing sides of the protector as described below so as to expose the internal compartments. The cables are inlayed within the appropriate compartments; it is not required to thread any cable through the protector, since the cable may be simply inlaid from the surface of the exposed compartments. Once suitably installed within the appropriate compartments, the walls of the protector are then closed and locked together, so as to form a trunk line cable protector having a separated array of cable types, as seen in FIG. 10. The cable protector 64 defining the trunk line is then placed within the trench, and suitable connections are made at the cable nodes.

Branch lines 62 may individually branch away at a plurality of t-intersection nodes, of the type described herein, towards individual users. These nodes may be formed at the time of initial installation of the network, or subsequently in the staged installation process described herein. In addition, the back-haul lines 62a or forward lines 62b may include within their conduits 64 the dark line segments described herein, arranged to be withdrawn when the need arises in a subsequent stage of installation.

As best seen in FIGS. 8-11, conduits 64 include two identical separable halves 68a and 68b that may be separated to permit access to the interior so as to install or remove cable therefrom. Each conduit 64 is formed from hard plastic material. The overall width of the conduits is narrow so as to fit within a channel 12. Conveniently, the interior of the conduit 64 is divided into vertically stacked sub-compartments 70a, 70b and 70c by internal dividers formed by divider fins 85 and 86 in order to facilitate cable handling and separation. The opposing walls 66a and 66b are retained together with interlocking clasps, as described below, such that the walls fully separate when pried apart. Alternatively, conduit 64 may comprise a flexible plastic material that permits the opposing walls to be pried or pulled apart from a longitudinal opening within the top or bottom portions connecting the opposing side walls to expose the interior of the conduit.

In the described embodiment, the opposing halves 68a and 68b are fully separable from each other. The halves 68a and 68b are identical, but are asymmetric top to bottom so as to lock together when they are inverted relative to each other, such that a first half 68a is oriented in a first direction and the second half 68b is inverted relative to the first half 68a. The halves of 68 are retained together by interlocking dividers, base and cap members, as described below. FIG. 8 illustrates one such half; the opposing half is identical, and mates to the first half when inverted. Each half 68a and 68b consists of an outer wall 66 having a generally flat outer surface 74. An array of fins protrude from the inner surface of the wall, to mate with opposing fins from a second half. The uppermost first fin 80 has an upwardly protruding upper face to form a ridged profile which assists in pushing the conduit into a soft surface. A second fin 82 is spaced downwardly from the first fin 80, defining a channel 84 between the two fins 80 and 82 to receive an opposing fin from the second half 68b of the conduit. The first and second fins 80 and 82 are dimensioned to fully span the width of the conduit so as to effectively seal the upper and bottom edges of the conduit when closed. Spaced downwardly from the second fins are divider fins 85 and 86 which likewise span the interior of the conduit and define the internal dividers that separate the conduit into three internal sub-compartments 70a, 70b and 70c (see FIGS. 10 and 11). Adjacent to each divider fin is a smaller retainer flange 88, spaced such that a shallow channel 90 is formed between each divider fin and retainer flange, to receive a corresponding fin from the second half 68b. The lowermost pair of fins 92 are adjacent to the base of the conduit and are spaced apart to define a lowermost channel 94 to receive a corresponding fin 82 from the opposing half 68b. When the two halves 68a and 68b are assembled, the base and cap members are each formed by three overlapping and interlocking fins 80, 82 and 92, which are received within channels 84 and 94.

The internal sub-compartments 70a, 70b and 70c are preferably configured to accept a plurality of cables of different types, as will be described below and illustrated in FIGS. 8-12, or alternatively are relatively short in height as see in FIGS. 1 and 2 according to the first embodiment.

The mating fins described above possess mating ribs 96 and grooves 98 extending lengthwise along the fins, which permit the two halves 68a and 68b to snap-lock together.

Alternatively, the halves 68a and 68b may be permanently joined together at the bottom or top, with the walls being separated from each other by flexing of the walls (not shown).

The branch lines 62 may be retained within a similar conduit as described above or alternatively within a conduit having a single internal compartment and a lower top to bottom height, reflective of the reduced number of cables retained therein.

Figure 11:
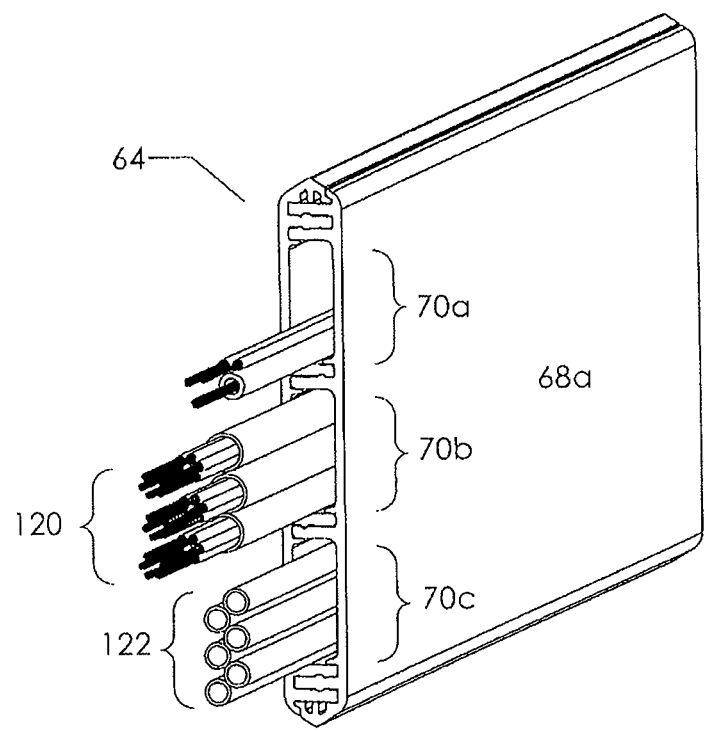
FIG. 11 is a perspective view of the conduit of FIG. 9 with a different array of tubes.
Figure 12:
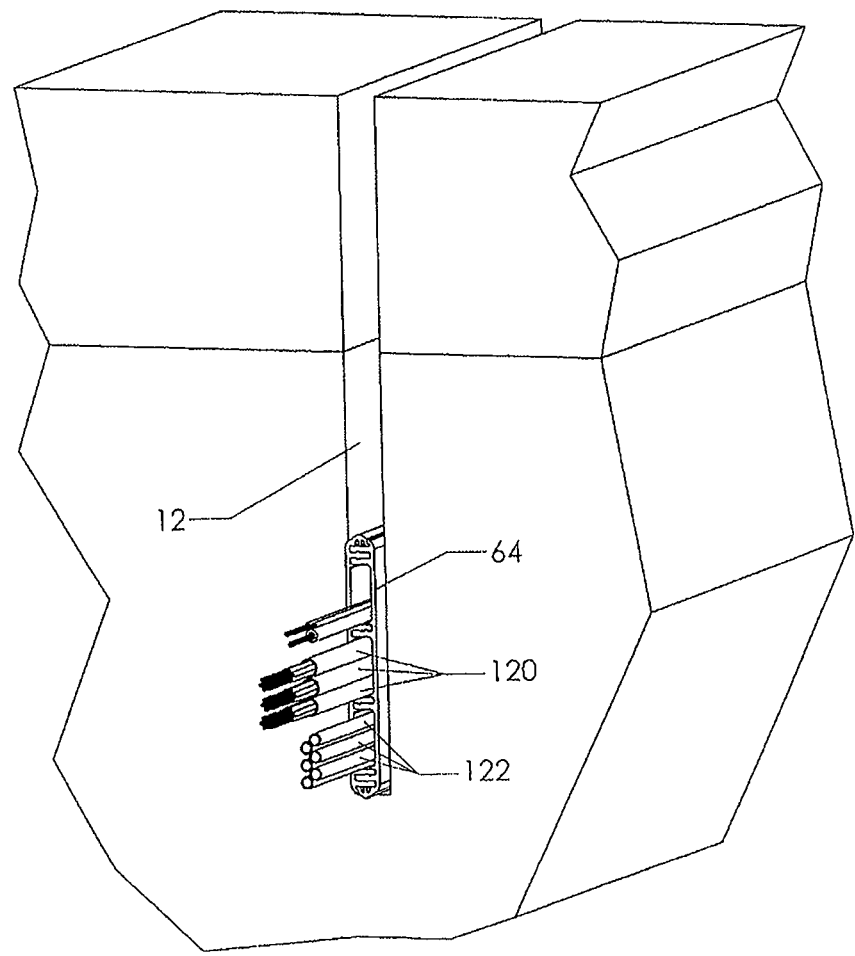
FIG. 12 is a cross-sectional schematic view of a conduit, installed within a surface, such as pavement.

Conveniently, the sub-compartments 70a, 70b and 70c within the conduit 64 are dimensioned to accept a plurality of cables therein. For this purpose, a suitable compartment dimension is 7 mm wide, and 19 mm high, with each compartment extending lengthwise the full length of the protector. As seen in FIG. 11, a compartment having these dimensions conveniently accepts a stacked array of three back-haul cables each having a diameter of 6 mm, or alternatively a larger number of blowing tubes or smaller cables, as seen in FIGS. 10 and 11.

FIG. 11 shows a typical arrangement in which the sub-compartments 70a, 70b and 70c retain blowing tubes of several sizes. The individual fibres or cables may be either dark or lit, as the need arises. The branch lines are installed within one or more narrow trenches, in the same fashion as the trunk line.

In one approach, only a single cable type is installed within each internal compartment. However, the installer may optionally mix cable types or sizes within any given compartment.

It will be seen that the present invention has been described by way of preferred embodiments of various aspects of the invention. However, it will be understood that one skilled in the art may readily depart from the embodiments described in detail herein, while still remaining within the scope of the invention as defined in this patent specification as a whole including the claims thereto. If will be further understood that structural or functional equivalents of elements described herein are considered to be within the scope of the invention, as well as departures from any directional references, dimensions or configurations described herein.

The invention claimed is:

1. A fibre optic network system for a multi-staged installation to a plurality of user locations, said system for installation with an aggregation point at a first location, a plurality of second locations comprising junction locations remote from said first location, said system comprising:
   a trunk line comprising a plurality of optic fibre cables for installation between said first and second locations, said trunk line including at least one dark cable having a length sufficient to reach a user location and configured in an elongate (uncoiled) configuration; and
   a trunk conduit composed of opposing side walls defining an interior space between said side walls for housing said cables, wherein:
   said dark cable is in an elongate configuration within said conduit,
   a portion of one of said side walls of said trunk conduit at said branch junction location comprises an opening to permit withdrawal of said dark cable at least at one of said second locations, and
   said trunk conduit comprises at least one internal divider defining a plurality of internal sub-compartments configured in a stacked vertical array extending lengthwise for retaining said cables, said trunk conduit being configured such that opening of said side wall at said branch junction location accesses at least one of said sub-compartments, said sidewall comprising a plurality of openings selectively covered by a cover to access said compartments.

2. A system as defined in claim 1, further comprising:
   at least one branch conduit extending from said branch junction location to a user location and a housing at said branch junction location, said housing comprising intersecting slots configured to receive said trunk and branch conduits and said optic fibre cables at said second location for protection against damage or contamination.

3. A system as defined in claim 2, wherein said housing is generally T-shaped and comprises a first slot for receiving said trunk line intersecting with a second slot for receiving said branch line.

* * * * *